United States Patent [19]

Bertolini

[11] Patent Number: 5,090,158
[45] Date of Patent: Feb. 25, 1992

[54] SUPPORT FOR PREASSEMBLED AND PREADJUSTED FITTINGS FOR A MOTOR VEHICLE DOOR, AND A DOOR HAVING THIS SUPPORT

[75] Inventor: Carlo Bertolini, Paris, France

[73] Assignee: Rockwell International Corporation, Pittsburgh, Pa.

[21] Appl. No.: 484,306

[22] Filed: Feb. 26, 1990

[30] Foreign Application Priority Data

Mar. 3, 1989 [FR] France .................. 89 02801

[51] Int. Cl.⁵ .............................................. E05F 11/38
[52] U.S. Cl. ........................................ 49/348; 49/502
[58] Field of Search ................. 49/227, 348, 349, 350, 49/351, 374, 502, 503

[56] References Cited

U.S. PATENT DOCUMENTS

| | | | |
|---|---|---|---|
| 1,961,507 | 6/1934 | Nicholson | 49/351 X |
| 2,145,659 | 1/1939 | Lane | 49/350 X |
| 3,659,381 | 5/1972 | Frey et al. | 49/349 X |
| 3,788,005 | 1/1974 | Mistopoulos, Jr. | 49/351 X |
| 4,151,683 | 5/1979 | Narita et al. | 49/351 X |
| 4,173,845 | 11/1979 | Heesch | 49/350 |
| 4,648,208 | 3/1987 | Baldamus et al. | 49/502 |
| 4,691,475 | 9/1987 | Maekawa | 49/349 X |
| 4,704,822 | 11/1987 | Srock et al. | 49/502 |
| 4,785,585 | 11/1988 | Grier et al. | 49/349 X |
| 4,831,710 | 5/1989 | Katoh et al. | 49/502 X |
| 4,924,630 | 5/1990 | Lomasney et al. | 49/502 |

Primary Examiner—Gary L. Smith
Assistant Examiner—Jerry Redman

[57] ABSTRACT

This support consists of a panel (11) and of a window-lift (13) plate (12) preassembled with the panel. This support is fastened to the door frame (3) on the one hand by fastenings between the panel (11) and the frame (3) and on the other hand by fastenings between the plate (12) and this same frame (3). It may be mounted in the door after the fittings (15, 16, 17 . . . ) have been preadjusted and enables them to be serviced conveniently without having to disassemble the whole of the support, while at the same time having a reduced cost.

2 Claims, 6 Drawing Sheets

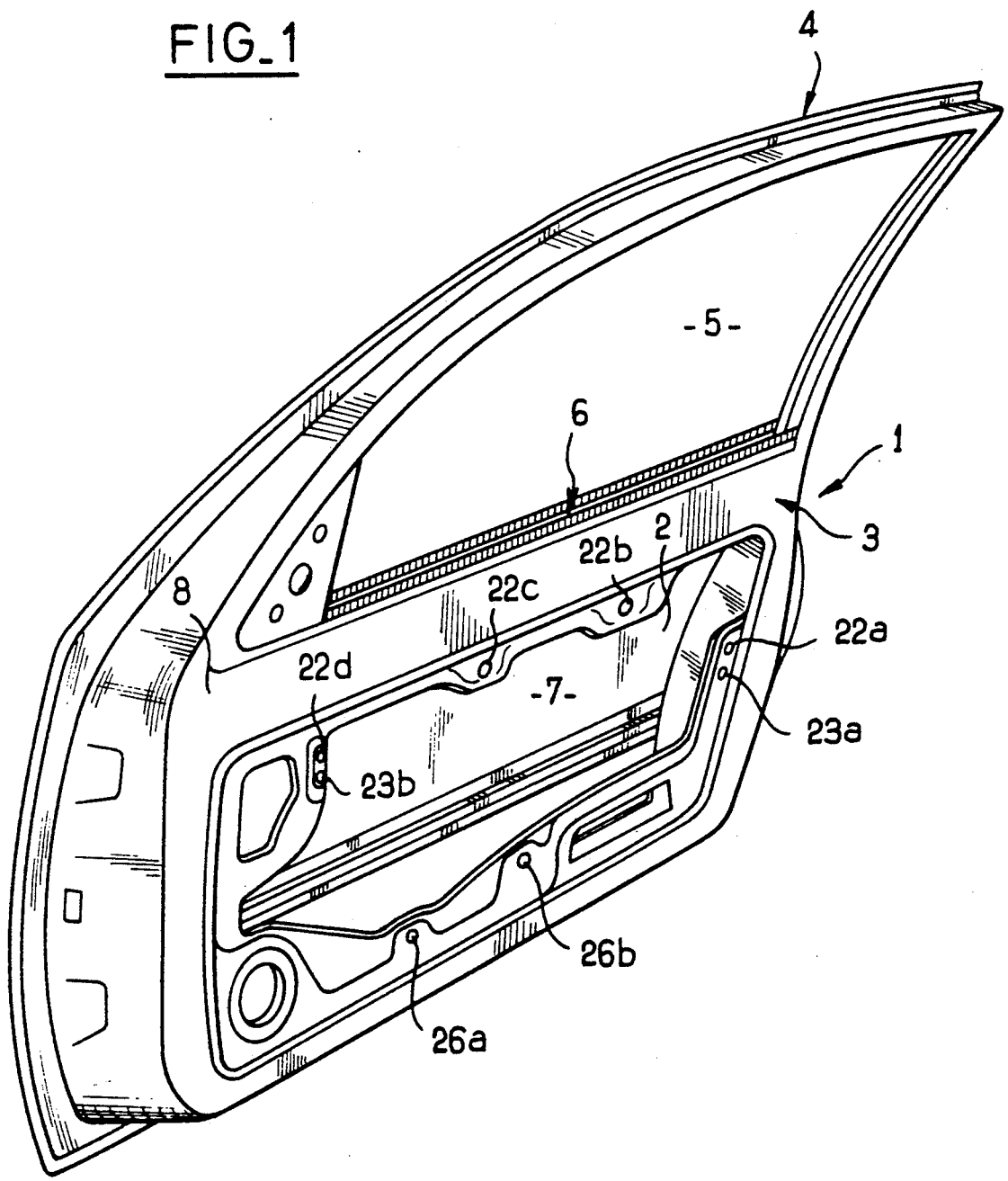
FIG_1

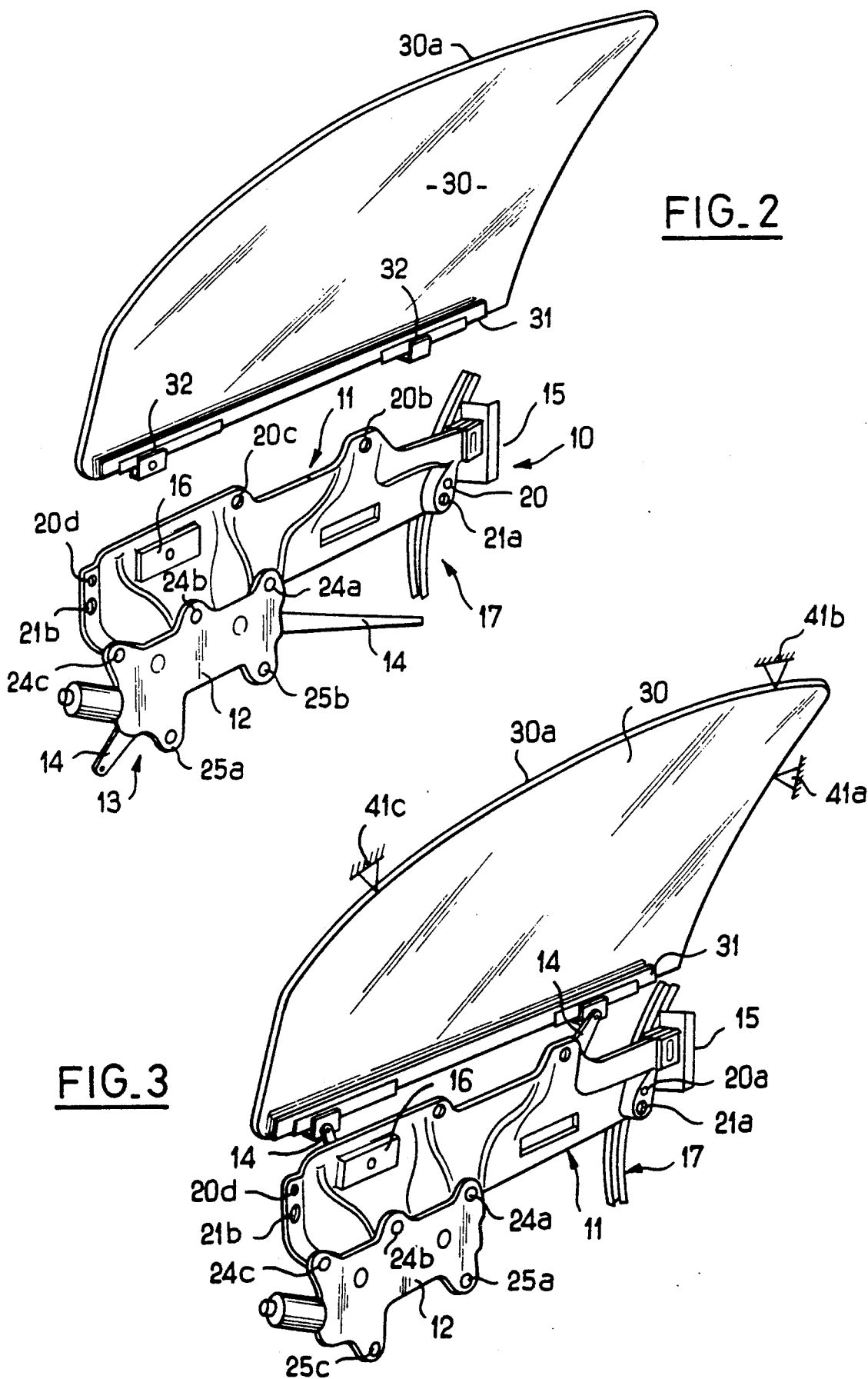

SUPPORT FOR PREASSEMBLED AND PREADJUSTED FITTINGS FOR A MOTOR VEHICLE DOOR, AND A DOOR HAVING THIS SUPPORT

The subject of the present invention is a motor vehicle door, the fittings of which are preassembled on a supporting panel.

Sheet metal panels are known which support fittings and the structure of which on the one hand receives the components to be installed in the door (window lift, window, guides, lock, opening control, rod assembly, speaker, etc.) and on the other hand serves to complete the door frame and gives it its final resistance.

Such panels are heavy because of their thickness and their large surface area which corresponds approximately to the opening in the frame required to introduce the components, chiefly the window, the window lift and the lock.

Attempts have therefore been made to reduce the thickness of the panel. However, limits are soon met with in this course of action since the panel must not lose too much rigidity and resistance because of its function in this respect in the vehicle.

Another approach consisted in integrating certain functions, such as the plate of the window lift, into the panel and to effect the pivoting of the arms directly by having them act as journals in bearings made in the supporting panel.

This last solution proves to be awkward to implement and requires the use of relatively thick pieces of sheet metal, which reduces its advantage in terms of economy and weight, because of the thickness of the sheet metal to be employed. Furthermore, the preadjusting of the window is more complicated and any repair poses problems caused by the structure of the pivot bearings which are precision elements difficult to disassemble and replace.

The object of the invention is therefore to provide a support for fittings, the structure of which simultaneously enables the reconciliation of a saving in weight, an economic saving in its cost price and a preadjusting of the components.

According to the invention, the support for fittings is characterized in that it has a panel provided with means for fastening the fittings and means for fastening to the door, and a window-lift plate provided with means for fastening onto the door, independently of the panel, the panel and the plate being fastened together.

It will be understood that such a structure enables the weight of the support to be optimized by thicknesses which are differentiated depending on the zones, and thus its cost price to be reduced, whilst at the same time simplifying the maintenance of the support and the repair of the fittings. Indeed, it becomes possible, for example, to disassemble the panel whilst leaving the window-lift plate in place, retained by its fastenings to the door, so as to move onto working on fittings other than the window lift, and this can be done without misadjusting the latter. The design of the panels known up until now, on the other hand, required them to be completely disassembled in order to work on any one of the fittings mounted on them.

The structure of the support according to the invention thus enables preadjusting of the fittings, in particular the elements of the window lift, easier repair and a reduced manufacturing cost to be obtained. Furthermore, the opening of the door frame necessary for installing such a support is minimal, and localized reinforcements may be provided on the panel wherever they prove to be necessary so as to optimize the weights.

In a preferred alternative, the panel supports all the components connected with the lock function, such as the inside handle, the rod, the lock, etc. so as to form an independent "lock unit", whereas the window lift comprises the elements necessary for the stability of the window so as to form a "window lift unit" which is also independent.

Other features and advantages of the invention will emerge from the description which follows, made with reference to the attached drawings which illustrate several of its embodiments by way of non-limiting examples.

FIG. 1 is a perspective view of the inner side of a motor vehicle door adapted to receive a support for fittings according to the invention.

FIG. 2 is an exploded perspective view of a support for fittings according to the invention, as well as the corresponding window.

FIG. 3 is a perspective view of the support for fittings and of the window in FIG. 2 during the preadjusting operations, in particular of the position of the window and of the window lift relative to two reference points of the panel.

Figure 4:
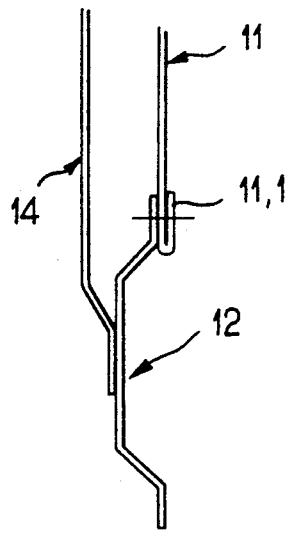
FIG. 4 is a diagrammatic end elevation view of the supporting panel and of the window-lift plate in FIG. 2.

In FIG. 1, a motor vehicle door can be seen having an opening 2 enabling components which are not shown (window lift, lock ...) to pass through. The opening 2 is provided in a frame 3 of the door 1, which door has a window frame 4 and a window opening 5. The window can slide in the frame 4 and be lowered through a window channel 6 provided inside the frame 3.

In FIG. 2, a support for fittings 10 can be seen consisting of a panel 11 and a plate 12 of a window lift 13 equipped with swivelling arms 14.

The support 10 has two zones, one of which forms the plate 12 of the window lift 13 and the other forms a panel 11 supporting other fittings. In the example described, the panel 11 has a thickness less than that of the plate 12 in dependence on the forces which are normally sustained by each zone 11 and 12. FIG. 4 shows the arrangement of the fastening of the plate 12 onto the panel 11, seen from the end. The panel 11 advantageously has a localized widened part formed by a fold 11.1 in the constituent metal sheet, intended to receive the plate 12; such localized reinforcements may, however, be present in other areas.

Figure 11:
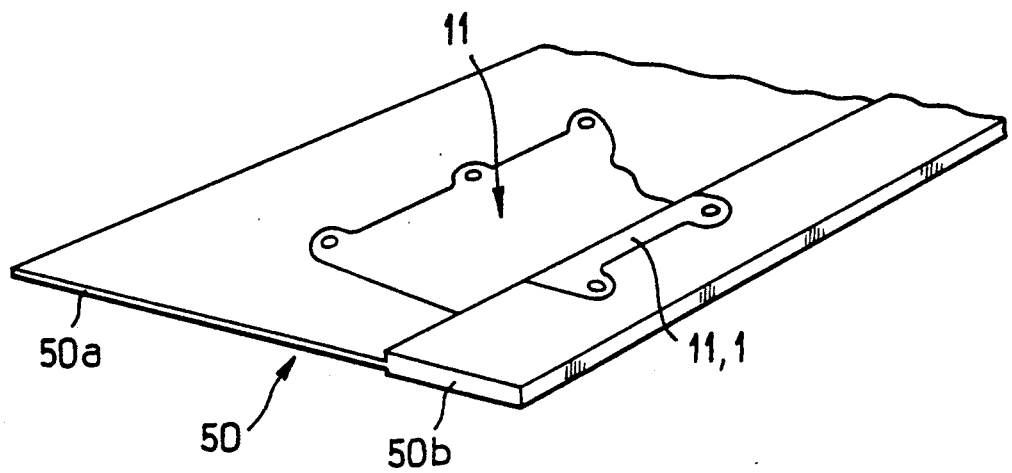
FIG. 11 is a perspective view of a piece of sheet metal with two thicknesses from which the panel of the support for fittings according to the invention can be blanked.

The manufacture of the panel 11 with thicknesses differentiated in this way may be performed, for example, from a metal sheet 50 formed from two parts 50a, 50b (FIG. 11) of different thicknesses which are welded together continuously. Blanking then takes place from this metal sheet 50 of the panel 11 with its part 11.1 with a large thickness made in the zone 50b of the metal sheet.

The panel 11 carries the following fittings: a lock 15, an opening controller 16, a rod assembly, which is not visible, and a slide 17. Means for fastening the fittings 15, 16 and 17, as well as for its fastening to the door 1, are furthermore provided in the panel 11. To this end, a series of fastening holes 20a, 20b, 20c, 20d as well as two centring flanges 21a and 21b, are provided in the panel 11. The fastening holes 20a–20d interact with the corresponding holes 22a to 22d provided on the edge of the cutout of the frame 3 of the door 1, whereas the centering flanges 21a, 21b interact with corresponding centering holes 23a and 23b of the door 1. The flanges 21a, b are preferably round and formed in the panel 11 (FIGS. 7, 8), whereas the corresponding holes in the frame 3 are preferably a round hole 23a or an oblong hole 23aa and a round hole 23b receiving the flanges 21a and 21b respectively. The fact that the hole 23aa is oblong facilitates the centering of the panel 11, to which the plate 12 has been assembled beforehand, on the door 1.

A second series of fastening holes 24a, 24b, 24c for the plate 12, which is pierced with corresponding holes intended to receive fastening members which are not shown, is also formed in the panel 11. Lastly, the plate 12 is pierced with holes 25a and 25b which can be aligned with respective holes 26a, 26b of the door 1 (FIG. 1) to which it may thus also be fastened.

The fastening holes 24a, 24b, 24c enable adjustment over the entire range of the manufacturing tolerance of the window and the window lift.

The window 30 is equipped at its base with an iron mounting 31 provided with shoes 32, preferably in accordance with those described in the French Patent Application 88 15,026 of 18 Nov., 1988 filed by the Applicant.

The centering flanges 21a and 21b associated with the centering holes 23a, 23b are reference points which enable the adjusting position of the window lift 12 on the panel 11 to be defined such that the window 30 has its upper edge 30a in the nominal position. This enables the variations in position of the edge 30a relative to the upper part of the frame 4 to be minimized.

Figure 5:
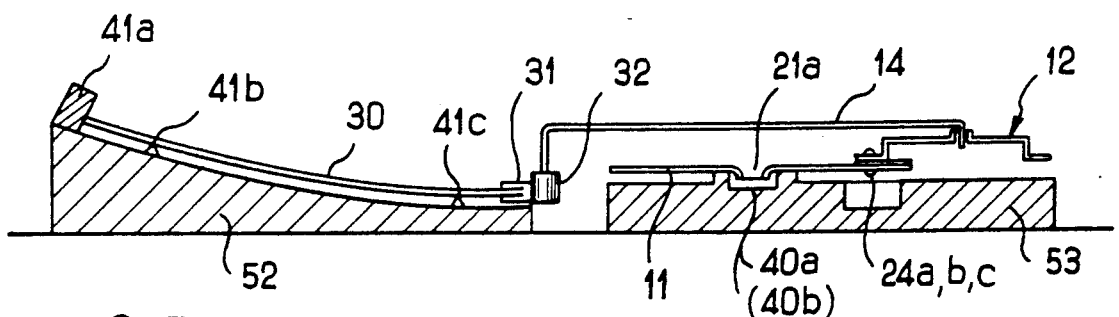
FIG. 5 is a lateral elevation view of the support for fittings in FIG. 2 and of a window, which are arranged on a template for preadjusting the window and the plate of the window lift relative to the panel.

The preassembly of the plate 12 and of the window lift 13 on the panel 11, as well as the preadjusting of the window 30 take place by positioning the window 30-- support 10 unit on a template consisting of a first part 52 equipped with stops 41a, 41b, 41c for positioning the window 30, and of a second part 53 receiving the support 10, these two parts resting on a horizontal plane (FIG. 5). The stops 41a–41c therefore form the references for the window 30, whereas the part 53 of the template is provided with holes 40a, 40b adapted to receive the respective flanges 21a, 21b of the panel 11. In practice, the arms 14 of the window lift 13 are brought into a raised position, to bring them into line with the shoes 32, and the fastening members (not shown) are locked in the holes 24a, b, c.

It can therefore be understood that, relative to the centering flanges 21a, 21b, the upper rim 30a of the window 30 occupies a nominal position defined by the stops 41a, 41b, 41c relative to the holes 40a, 40b.

The fastening holes 20a to 20d and 22a to 22d, as well as 26a, 26b and 25a and 25b, have a sufficient clearance in order to be able to absorb the construction tolerances, after the centering flanges 21a, 21b have been positioned in the holes 23a, 23b during mounting in the door.

Figure 7:
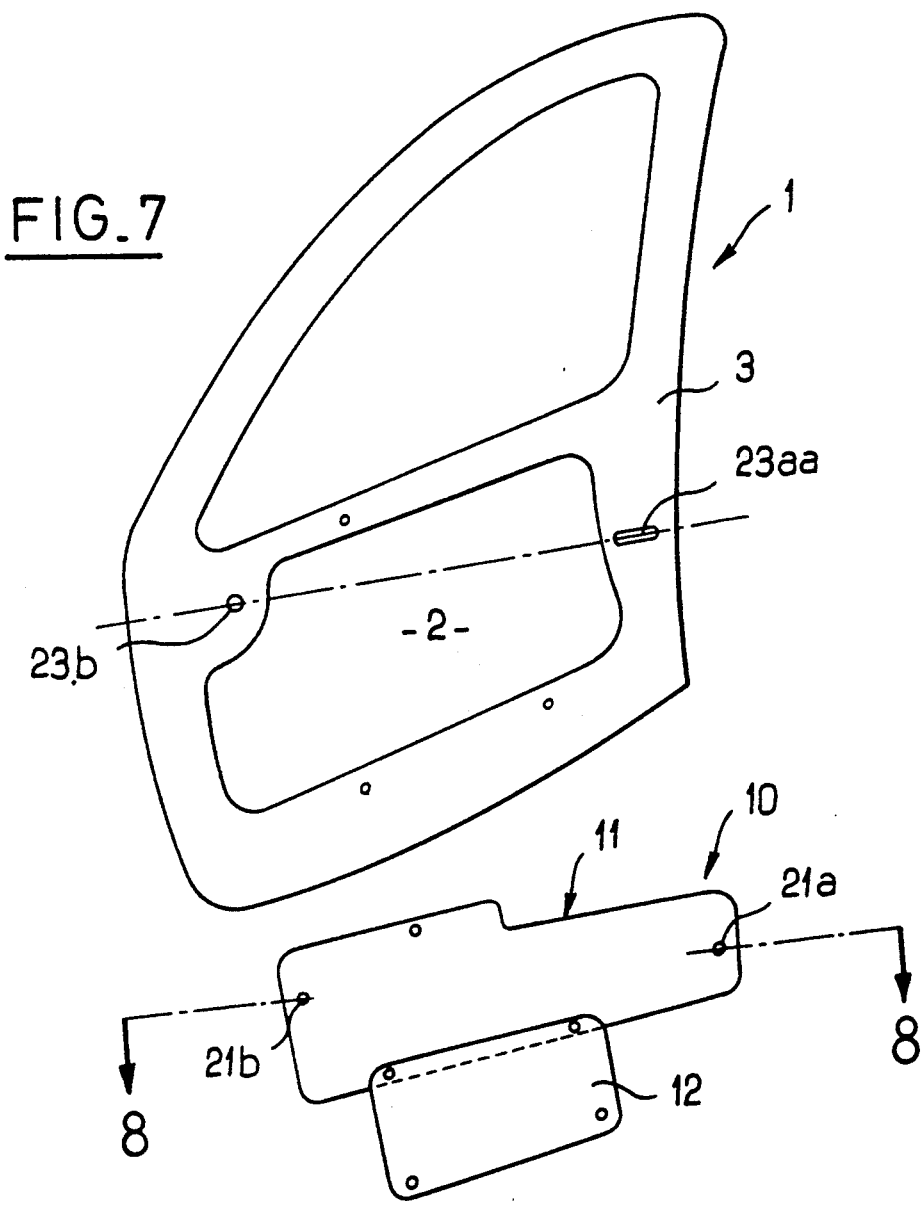
FIG. 7 is a diagrammatic perspective view of the door and of the support for fittings in FIGS. 1 to 6 showing the holes for centering the support on the door.
Figure 8:
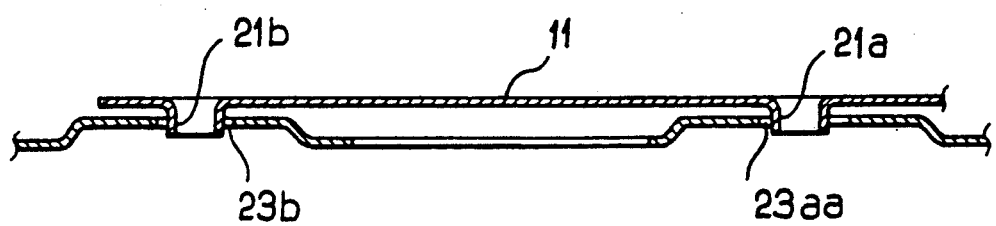
FIG. 8 is a view in longitudinal cross-section along 8—8 of FIG. 7, it being assumed that the panel is centered on the door.

It will be noted that the centering holes 23aa and 23b are arranged such that the axis of the oblong hole 23aa passes through the center of the hole 23b (FIG. 7).

Furthermore, a control for the satisfactory operation of the unit may be provided on the device in FIG. 3. During the adjusting and the controlling, the shoes 32 of the iron mounting 31 are not completely locked, so as to enable disassembly with a view to mounting the window 30 and the support 10 in the door 1.

In order to mount the support 10 in the door 1, it is installed such that the centering flanges 21a, 21b are situated opposite centering holes 23a, 23b and then the final fastening of the panel 11 onto the door 1 is performed by the associated holes 20a–20d and 22a–22d, and lastly 25a–25b interacting with the holes 26a, 26b, the plate 12 having been assembled with the panel 11 beforehand, as described above with reference to FIGS. 2 and 3.

The window 30 is then introduced through the window channel 6 and the shoes 32 are installed on the ends of the arms 14 of the window lift 13. (This takes place naturally if the pieces have been brought into the right position).

Lastly, the shoes of the iron mounting 31 are locked, as described in the abovementioned Patent Application 88 15,026.

It is possible to disassemble the window lift 13 by removing only the fastenings corresponding to the holes 24a, 24b, 24c and 25a, 25b, while the panel 11 and the corresponding fittings remain in place. Similarly, it is possible to disassemble and to replace the panel 11 without losing the adjustment of the window 30, and without having to disassemble the window lift 13. Indeed, the plate 12 of the window lift remains in place in the door 1 by its fastening holes 25a, 25b which remain locked.

The combined support according to the invention thus enables servicing to be carried out more easily than before, since it is no longer necessary to disassemble and withdraw the entire support from the door, which furthermore avoids fresh adjustments after remounting.

As is known, a panel which supports fittings inside a vehicle door contributes to the rigidity and the resistance of the whole of the vehicle. This function is fulfilled satisfactorily by the support for fittings formed by the combination of the panel 11 and the plate 12 as a result of the sufficient thickness of the fastening zone 11.1 of the plate 12 onto the panel 11. As is known, the rigidity of the door is translated as its capacity of not being crushed under an impact and of ensuring a satisfactory compression of the door joints. On the other hand, its resistance is its capacity to resist permanent deformation. In general, a resistant door is also rigid.

Furthermore, the plate 12 may in a certain number of cases support fittings itself, such as an arm rest attachment, a radio speaker, a door-opening handle. The plate 12 contributes in all cases to the rigidity of the door.

Figure 9:
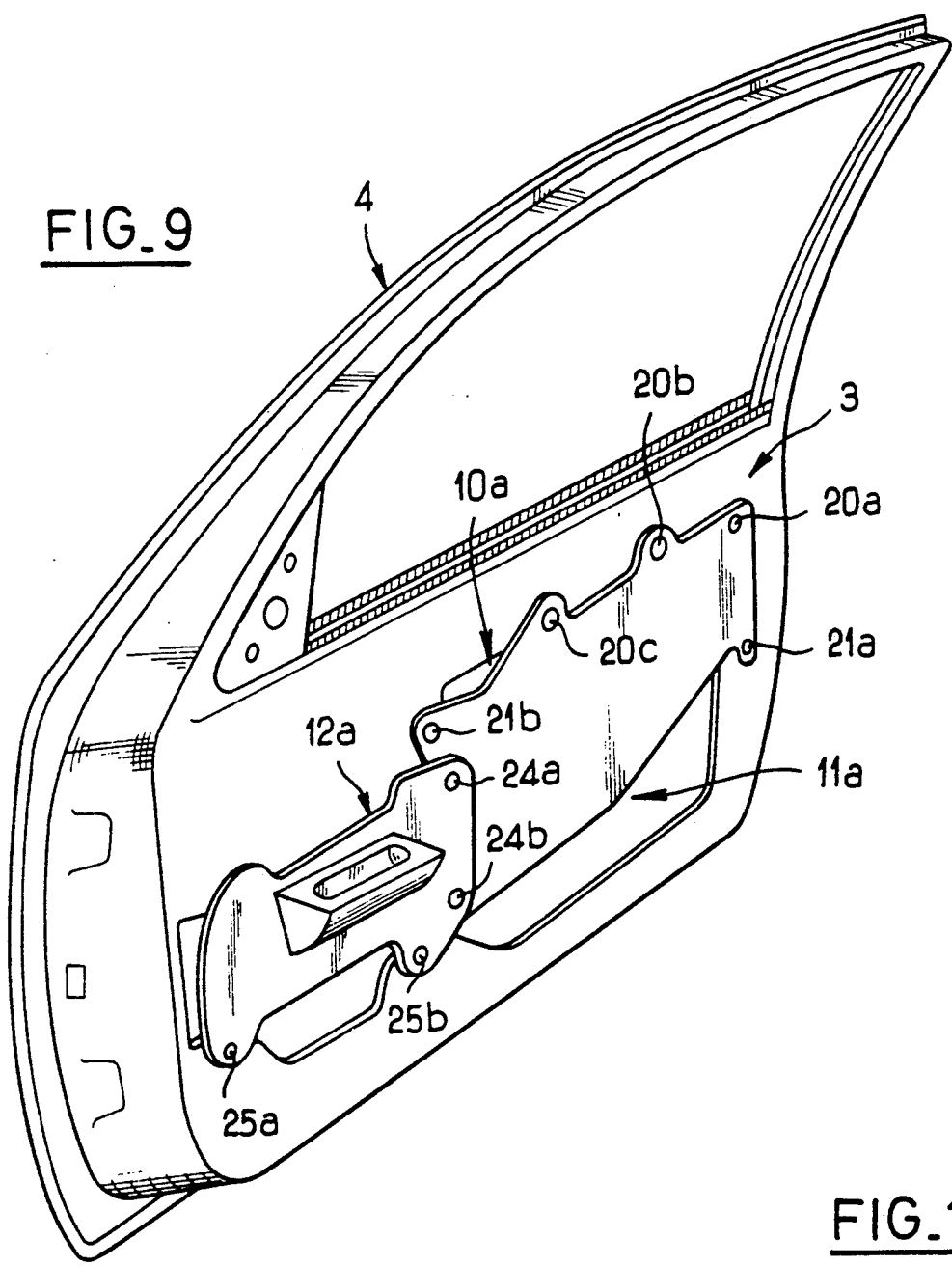
FIG. 9 is a perspective view of a vehicle door with which a second embodiment of the support for fittings according to the invention has been integrated.

FIG. 9 shows another embodiment of the support according to the invention in which the panel 11a is shaped differently to the panel 11 and occupies a different position. Indeed, the plate 12a of the window lift is here fastened laterally to the panel 11a by its two holes 24a, 24b. Complementary holes 25a, 25b, 25c, 25d enable its fastening to the frame 3 of the door 1. A lateral fastening of the plate 12a to the panel 11a further improves the rigidity of the whole.

Figure 10:
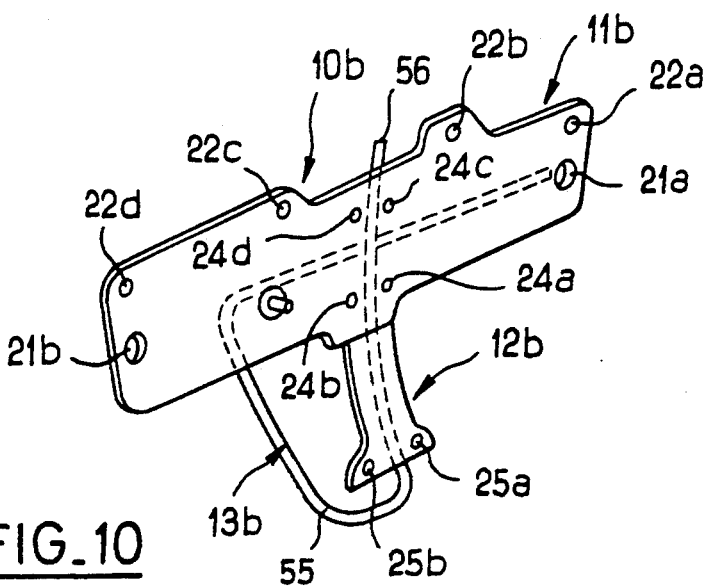
FIG. 10 is a perspective view of a third embodiment of the support for fittings according to the invention.
Figure 6:
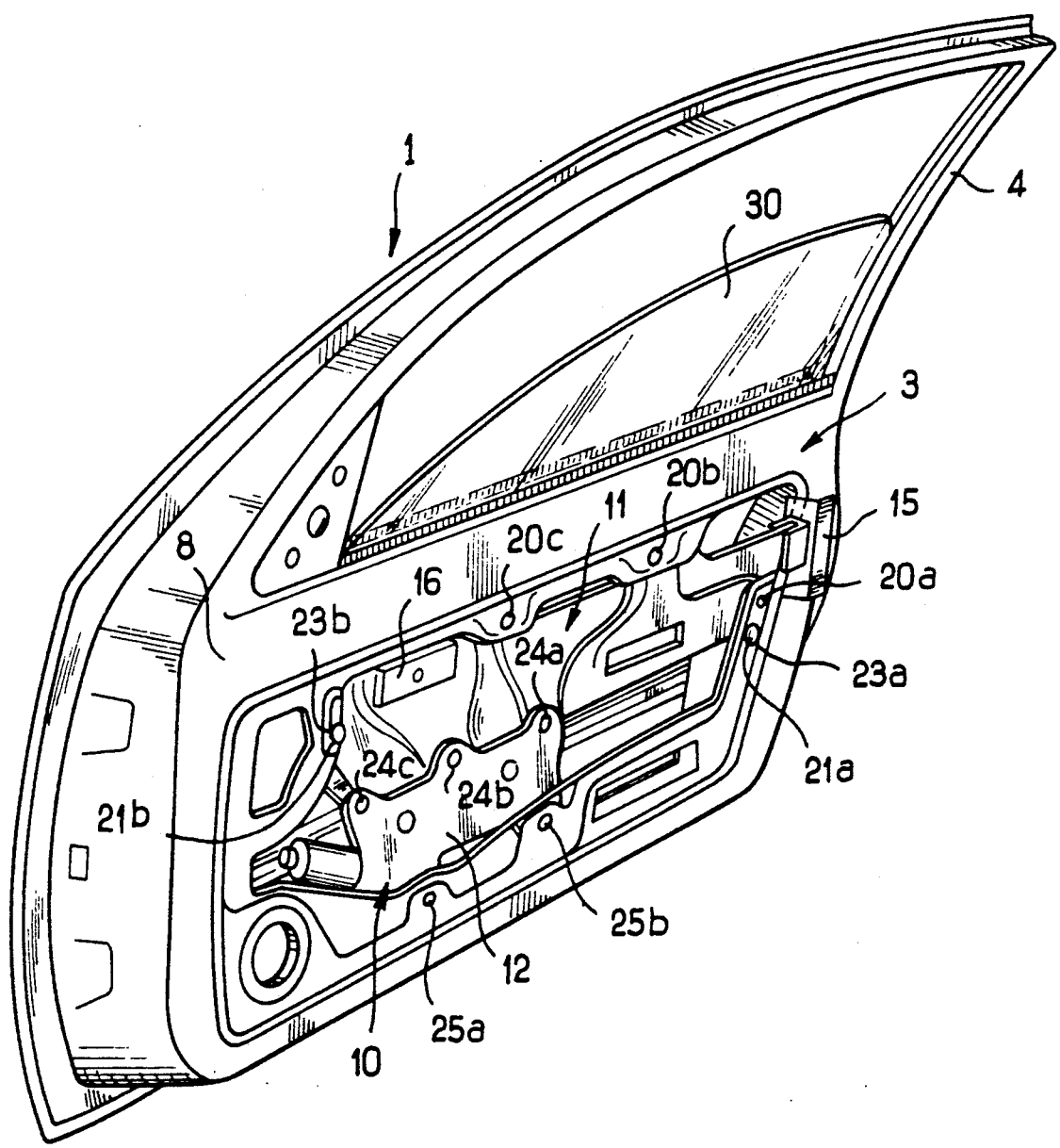
FIG. 6 is a perspective view corresponding to FIG. 1, of a door with which the support for fittings has been integrated.

In the alternative in FIG. 10, the support 10b has a plate 12b no longer supporting a window lift with swivelling arms 14 but a window lift 13b of the type having rails 55, 56 suitably attached to the panel 11b. The plate 12b is situated beneath the central zone of the panel 11b, to which it is fastened by its two holes 24a, 24b. The window slide 17 is not required in certain circumstances when using a window lift having rails such as 13b.

A possible alternative consists in replacing the flanges 21a and 21b by simple round holes having the same diameter as the holes 23a and 23b and intended to receive temporarily during mounting centering pins traversing these round holes and, on the other hand, the holes 23a, 23b. These pins are removed after the final fastening has been achieved.

In the examples shown, the support 10 is fastened surface-mounted on the inner metal sheet 8 of the frame 3. However, it could be fastened similarly onto the outer metal sheet 7 of this frame 3, the door 1 being completed by a decorative outer skin intended to close the corresponding opening.

I claim:

1. A support for fittings and components mounted internally of a motor vehicle door comprising:
    a panel provided with means for fastening the fittings and components to said panel and means for fastening said panel to the door,
    said means for fastening said panel to the door include centering means in the form of flanges provided to the panel,
    corresponding holes provided to the door for receiving the flanges, and complementary holes in said panel for receiving elements for fastening said panel to the door,
    a separate window-lift plate provided with means for fastening the plate onto the door independently of the panel,
    means for fastening the panel and the plate together, and
    said complimentary holes provide a sufficient clearance to absorb construction tolerances when said panel and plate are positioned on said door by said centering means.

2. A support according to claim 1, wherein one of said corresponding holes provided to said door is oblong.

* * * * *